United States Patent
Sun et al.

(10) Patent No.: US 12,261,663 B2
(45) Date of Patent: Mar. 25, 2025

(54) ENHANCEMENT OF BEAM MANAGEMENT FOR MULTI-TRP OPERATION

(71) Applicant: APPLE INC., Cupertino, CA (US)

(72) Inventors: Haitong Sun, Cupertino, CA (US); Chunxuan Ye, San Diego, CA (US); Dawei Zhang, Cupertino, CA (US); Hong He, Cupertino, CA (US); Jie Cui, Cupertino, CA (US); Seyed Ali Akbar Fakoorian, San Diego, CA (US); Sigen Ye, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,710

(22) PCT Filed: Jul. 28, 2021

(86) PCT No.: PCT/CN2021/108830
§ 371 (c)(1),
(2) Date: Sep. 23, 2021

(87) PCT Pub. No.: WO2023/004612
PCT Pub. Date: Feb. 2, 2023

(65) Prior Publication Data
US 2024/0022298 A1    Jan. 18, 2024

(51) Int. Cl.
*H04B 7/06*    (2006.01)
*H04B 17/318*    (2015.01)
*H04B 17/336*    (2015.01)

(52) U.S. Cl.
CPC ......... *H04B 7/0626* (2013.01); *H04B 17/328* (2023.05); *H04B 17/336* (2015.01)

(58) Field of Classification Search
CPC .................................................. H04B 7/0626
See application file for complete search history.

(56) References Cited

U.S. PATENT DOCUMENTS 11,777,576 B2 * 10/2023 Gao ................ H04B 17/345
                                                           370/329
2019/0297519 A1 * 9/2019 Han ................ H04W 72/54
(Continued)

FOREIGN PATENT DOCUMENTS

WO    2020187392 A1    9/2020
WO    2021034672 A1    2/2021

OTHER PUBLICATIONS

Ericsson, "On beam management enhancements for simultaneous multi-TRP transmission with multi-panel reception", R1-2103545, 3GPP TSG-RAN WG1 Meeting #104bis-e. e-Meeting, Agenda Item 8.1.2.3, Apr. 12-20, 2021, 8 pages.
(Continued)

*Primary Examiner* — Guang W Li
(74) *Attorney, Agent, or Firm* — Dorsey & Whitney LLP (57) ABSTRACT

Configuring channel state information reference signal (CSI-RS) reporting at a network may include encoding a channel state information (CSI) reporting configuration communication for transmission to a user equipment (UE) that is in connected mode with both a first transmission and reception point (TRP) and a second TRP. The CSI reporting configuration may include a first group of CMR (Channel Measurement Resource) resources for the first TRP, and a second group of CMR resources for the second TRP. A CSI measurement communication received from the UE, may be measurements based on the CSI-RS reporting configuration communication. Based on the CSI measurement communication, one or more downlink data transmissions may be scheduled.

18 Claims, 7 Drawing Sheets

(56) References Cited

U.S. PATENT DOCUMENTS

2019/0379506 A1    12/2019  Cheng et al.
2020/0350967 A1*  11/2020  Xu ......................... H04B 7/022
2021/0028843 A1*  1/2021  Zhou ..................... H04B 7/063
2024/0015551 A1*  1/2024  Khoshnevisan ...... H04L 5/0023

OTHER PUBLICATIONS

PCT/CN2021/108830, International Search Report and Written Opinion, Apr. 20, 2022, 9 pages.

Spreadtrum Communications, "Discussion on enhancements on beam management for multi-TRP", R1-2104413, 3GPP TSG RAN WG1 #105-e, e-Meeting, Agenda Item 8.1.2.3, May 10-27, 2021, 6 pages.

ZTE, "Enhancements on beam management for multi-TRP", R1-2104587, 3GPP TSG RAN WG1 Meeting #105-e, e-Meeting, Agenda Item 8.1.2.3, May 10-27, 2021, 17 pages.

* cited by examiner

ENHANCEMENT OF BEAM MANAGEMENT FOR MULTI-TRP OPERATION

TECHNICAL FIELD

This application relates generally to wireless communication systems, including beam management for multi-transmission and reception point (TRP) operation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Multi-transmission and reception point (TRP) allows a user equipment (UE) to connect with multiple TRPs. Multi-TRP operation was implemented to improve operation of user equipment (UE). For example, multi-TRP operation may improve reliability, coverage, and capacity performance.

As multi-TRP operation requires coordination between the UE and multiple TRPs, configuration is useful to ensure proper operation of the UE and network nodes. In some embodiments, the multiple TRPs may be within a single cell (intracell) and have the same cell ID. In other embodiments, the multiple TRPs may be in neighboring cells (intercell) and have different cell IDs. The different cell IDs may make reference signal configuration even more complicated.

Despite some enhancements associated with multi-TRP being introduced, several issues still remain, as are discussed further throughout this disclosure. Specifically, beam measurement reporting may be enhanced through strategic configuration and reporting methods. Similarly, multi-TRP beam failure recovery may be enhanced as discussed throughout this disclosure.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
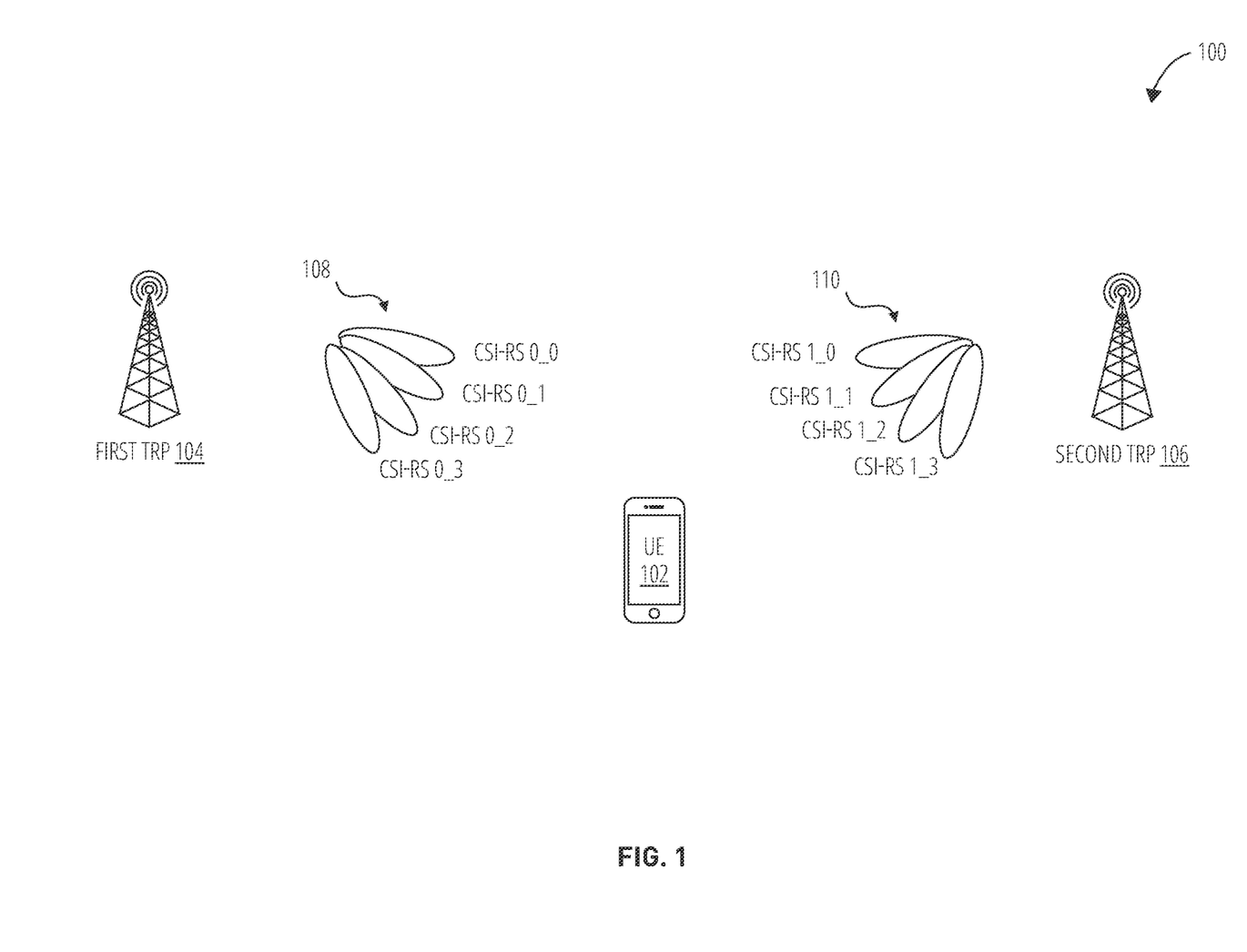
FIG. 1 illustrates a UE performing beam measurement for multi-TRP operation in accordance with one embodiment.

FIG. 1 illustrates a UE 102 performing beam measurement for multi-TRP operation according to some embodiments. As shown, a network 100 may include a first TRP 104 and a second TRP 106. The first TRP 104 and the second TRP 106 may be network nodes (e.g., gNodeB) belonging to a same cell or different cells. The first TRP 104 and the second TRP 106 are each configured to communicate with a UE 102.

As further shown, each TRP (i.e., the first TRP 104 and the second TRP 106) includes various CSI-RS resources. The first TRP 104 includes a first set of RS resources 108 including CSI-RS 0_0, CSI-RS 0_1, CSI-RS 0_2, and CSI-RS 0_3. The second TRP 106 includes a second set of RS resources 110 including CSI-RS 1_0, CSI-RS 1_1, CSI-RS 1_2, and CSI-RS 1_3. While the illustrated embodiment contains four resources for each TRP, more resources may be associated with one or both TRPs. The resources may be paired by the network 100. That is each one of the resources from the first set of RS resources 108 may be paired with one of the resources from the second set of RS resources 110.

Figure 2:
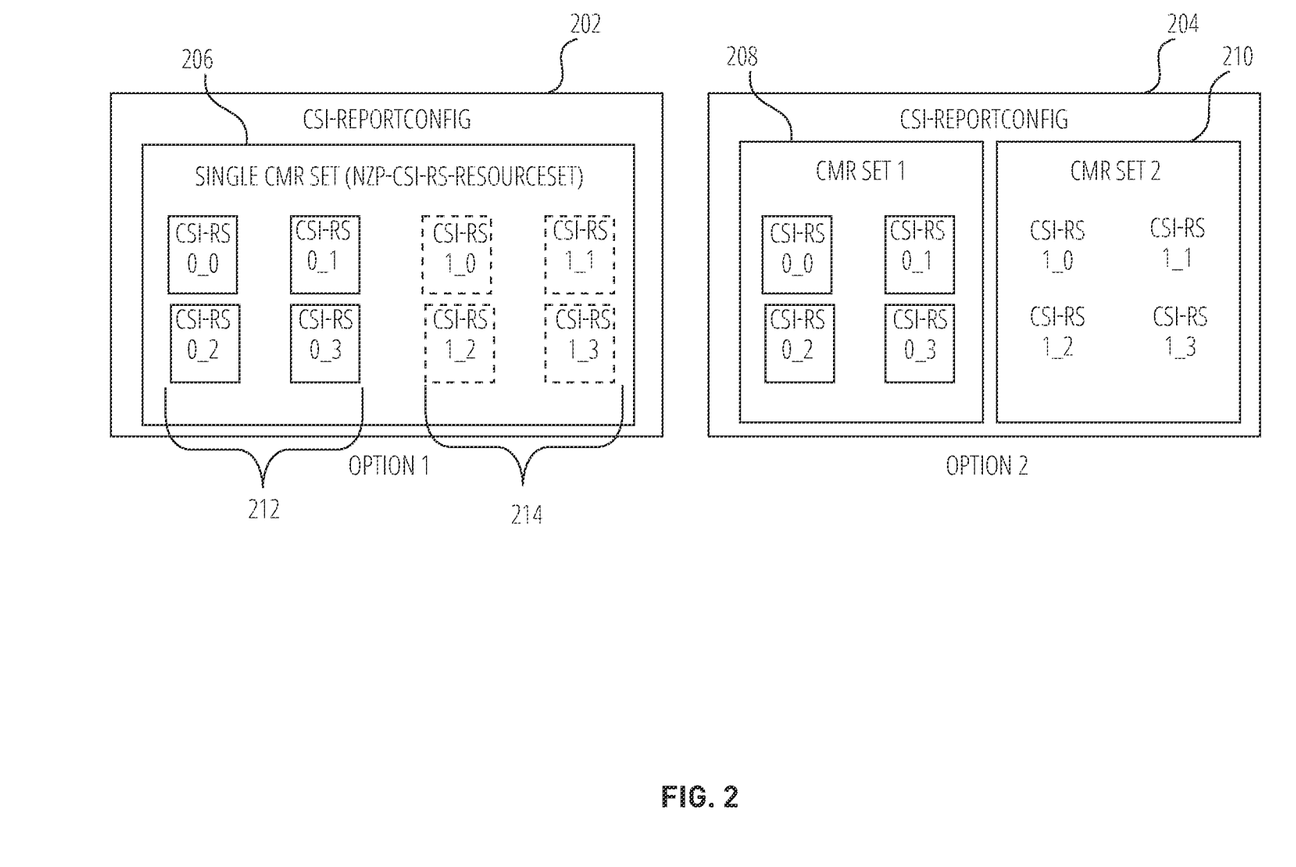
FIG. 2 illustrates two different options for a single channel state information (CSI) reporting configuration communication in accordance with one embodiment.
Figure 6:
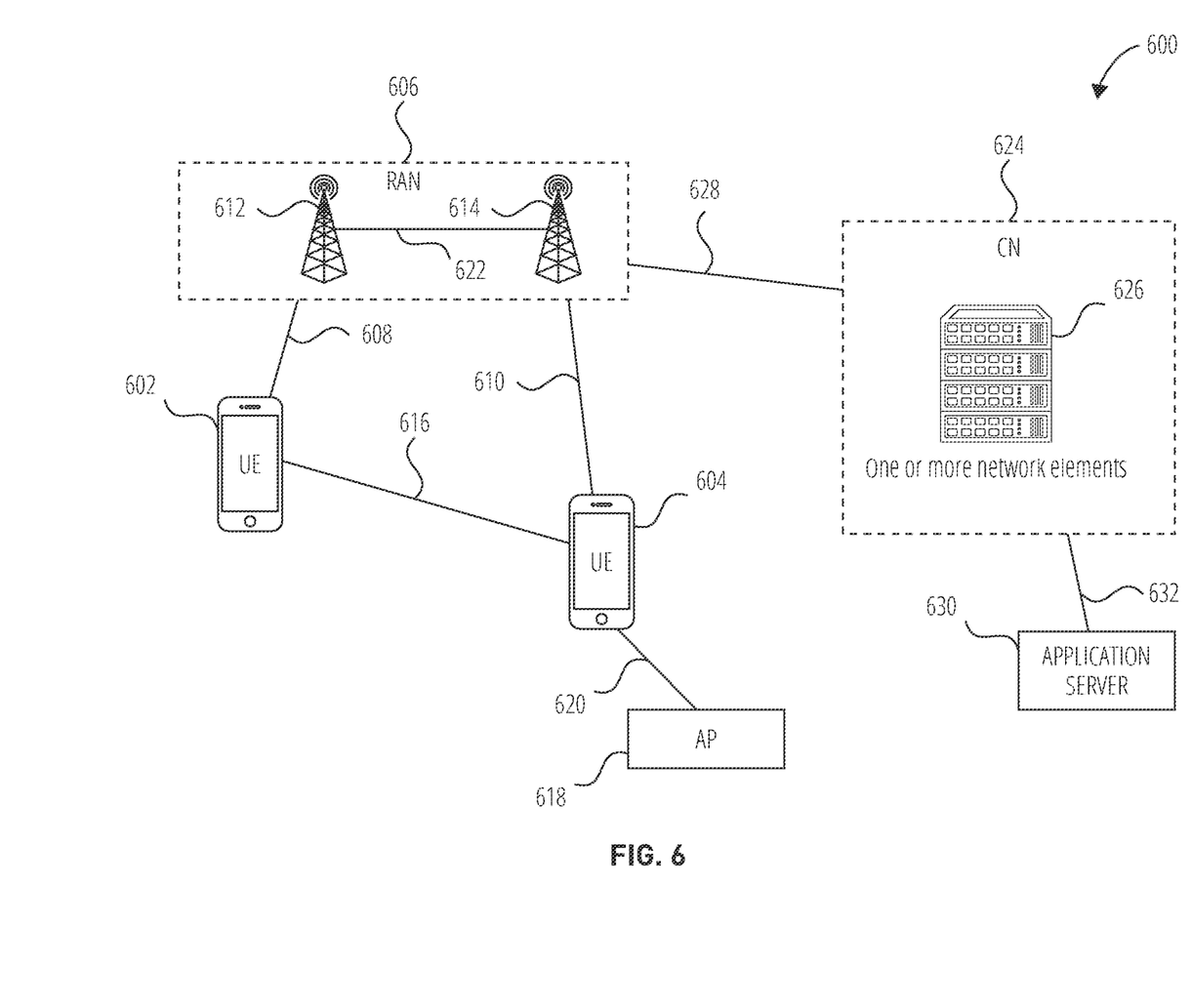
FIG. 6 illustrates an example architecture of a wireless communication system, according to embodiments disclosed herein.
Figure 7:
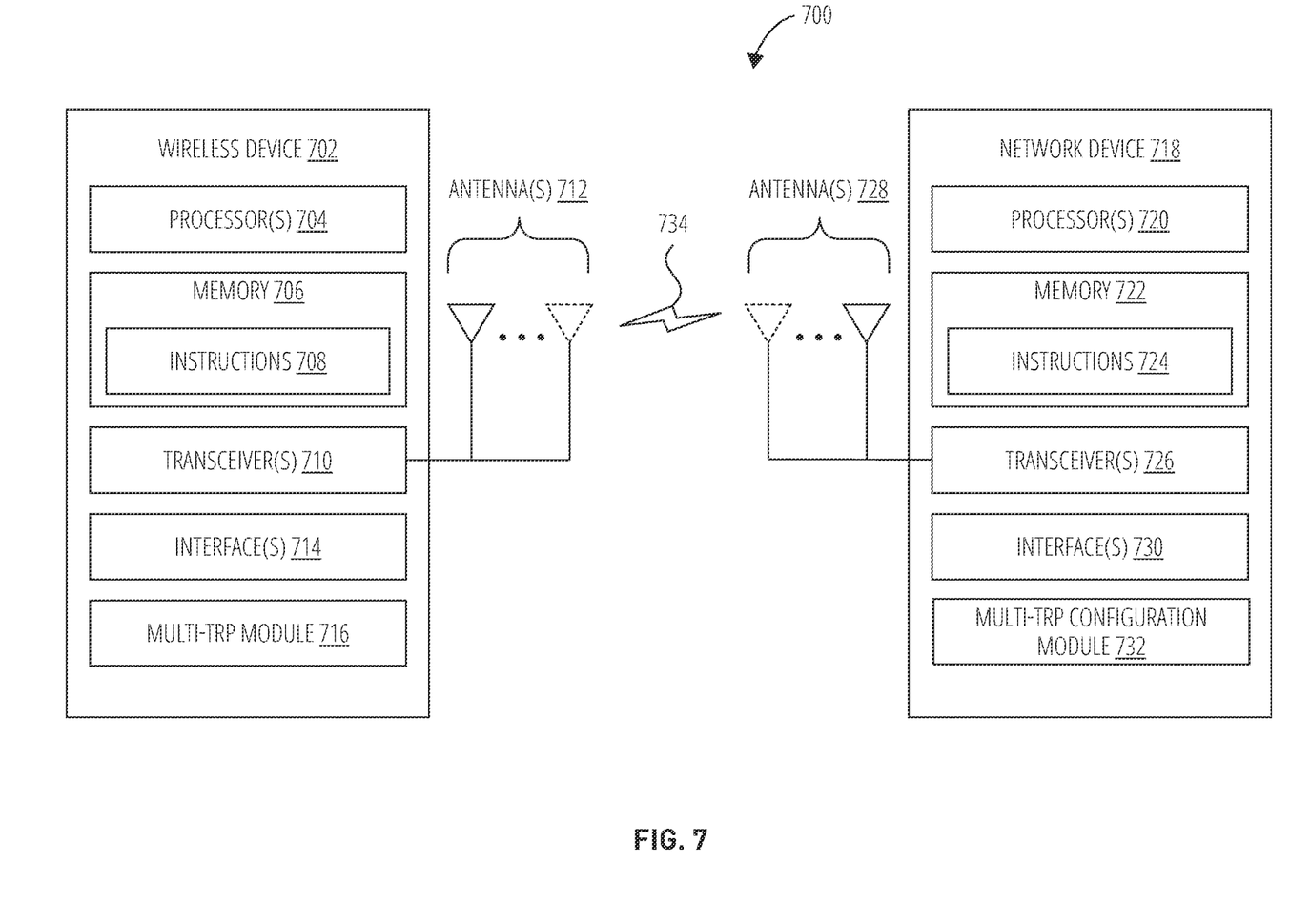
FIG. 7 illustrates a system for performing signaling between a wireless device and a network device, according to embodiments disclosed herein.

Described herein are principles that may be used to configure Channel Measurement Resources (CMRs). For example, FIG. 2 illustrates two ways CSI-ReportConfig may be structured for configuring CSI-RS resources as channel measurement resources (CMRs). Further, FIG. 6 and FIG. 7 illustrate flowcharts of methods for CSI-RS resources being configured as CMRs. Further, principles that are described herein may be used by the UE to perform and report measurements. Additionally, principles herein may be use for multi-TRP beam failure recovery as discussed in FIG. 3.

FIG. 2 illustrates two different options for a single channel state information (CSI) reporting configuration communication (CSI-ReportConfig) that includes CSI-RS resource configuration for both the first TRP 104 and the second TRP 106 of FIG. 1. Each option represents a different embodiment of a CSI-ReportConfig for transmission to a UE. Both embodiments comprise a CSI-ReportConfig that includes a first group of CMR (Channel Measurement Resource) resources for the first TRP (e.g., CSI-RS 0_0, CSI-RS 0_1, CSI-RS 0_2, and CSI-RS 0_3), and a second group of CMR resources for the second TRP (e.g., CSI-RS 1_0, CSI-RS 1_1, CSI-RS 1_2, and CSI-RS 1_3).

The first option of the CSI-ReportConfig 202 comprises a single CMR set 206. For instance, the single CMR set 206 may be a NZP-CSI-RS-ResourceSet for CMR that includes the resources corresponding to the first TRP 104 (e.g., CSI-RS 0_0, CSI-RS 0_1, CSI-RS 0_2, and CSI-RS 0_3) and the resources corresponding to the second TRP 106 (e.g., CSI-RS 1_0, CSI-RS 1_1, CSI-RS 1_2, and CSI-RS 1_3).

In some embodiments, the resources in the single CMR set 206 may be all of the resources for both TRPs configured for the UE. The single CMR set 206 can be configured and contain N resources where N represents the total number of resources from both TRPs configured for the UE. The N resources may be split into two subsets. For example, the total number of resources, N, may be N=N1+N2, where N1 and N2 represent the number of resources from the first subset 212 and N2 represents the number of resources from the second subset 214. The first subset 212 may correspond to the first TRP, and include N1 number of CMR resources. In the illustrated embodiment, the first subset 212 includes four CMR resources associated with the first TRP including CSI-RS 0_0, CSI-RS 0_1, CSI-RS 0_2, and CSI-RS 0_3. The second subset 214 may correspond to the second TRP, and include N2 number of CMR resources. In the illustrated embodiment, the second subset 214 includes four CMR resources associated with the second TRP including CSI-RS 1_0, CSI-RS 1_1, CSI-RS 1_2, and CSI-RS 1_3.

In some embodiments the network may configure additional information to allow the UE to determine which TRP is associated with which set of resources in the single CMR set 206. In one embodiment, the network may encode a bitmap where a bit is set to "0" to represent the first TRP, and a bit is set to "1" to represent the second TRP. In another embodiment, the network may send an integer to the UE. The integer may be equal to the number of resources in the first subset 212 (i.e., N1). The UE may determine that the first N1 resources correspond to the first TRP and the remaining resources (i.e., N-N1) correspond to the second TRP.

The second option of the CSI-ReportConfig 204 comprises two sets of configured CMRs. The first CMR set 208 may correspond to the first TRP (e.g., first TRP 104 of FIG. 1). The first CMR set 208 may include N1 number of CMR resources. In the illustrated embodiment, the first CMR set 208 includes four CMR resources associated with the first TRP including CSI-RS 0_0, CSI-RS 0_1, CSI-RS 0_2, and CSI-RS 0_3. The second CMR set 210 may correspond to the second TRP (e.g., second TRP 106 of FIG. 1). The second CMR set 210 may include N2 number of CMR resources. In the illustrated embodiment, the second CMR set 210 includes four CMR resources associated with the second TRP including CSI-RS 1_0, CSI-RS 1_I, CSI-RS 1_2, and CSI-RS 1_3.

Figure 3:
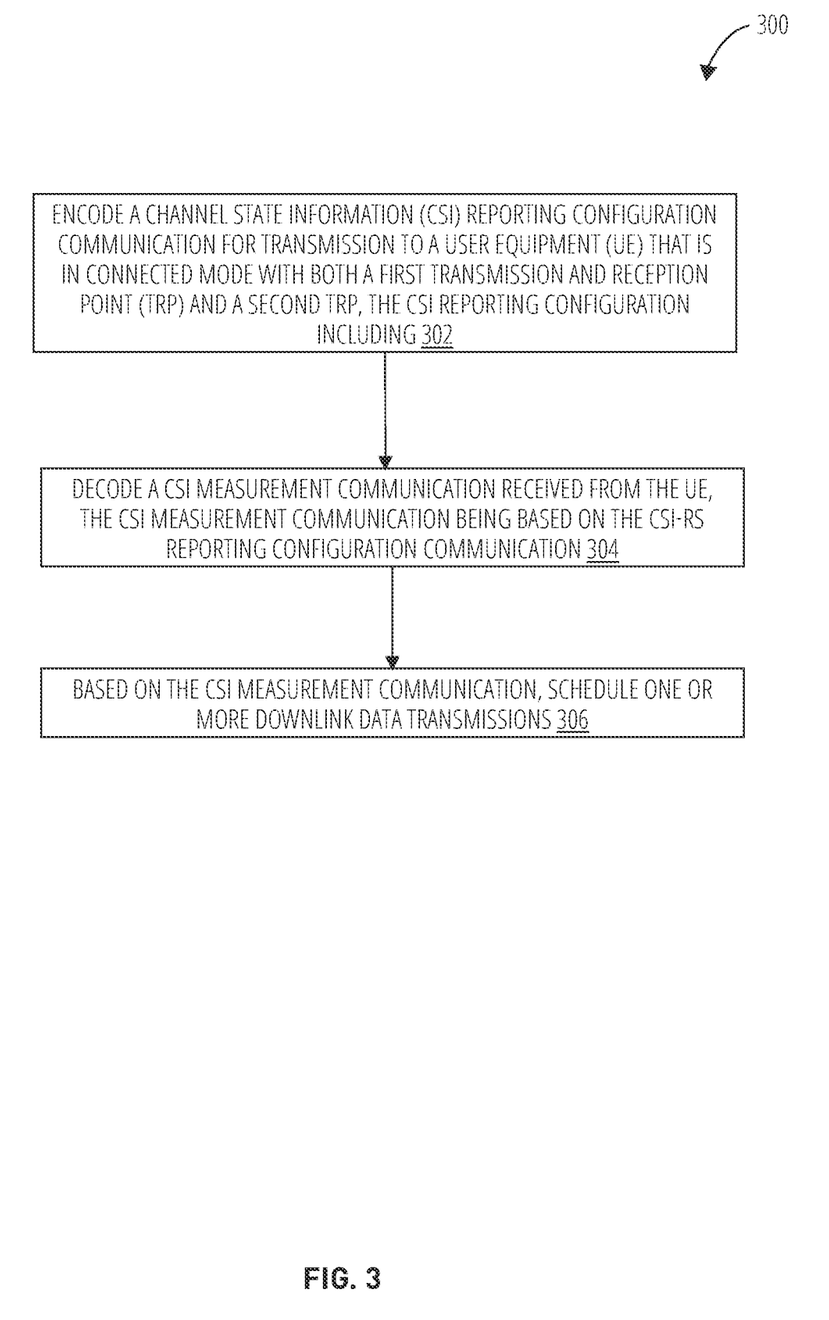
FIG. 3 illustrates a flow chart of a method for a network node to configure CMR resources, in accordance with one embodiment.

FIG. 3 illustrates a flow chart of a method 300 for a network node to configure CMR resources. The network node may encode 302 a channel state information (CSI) reporting configuration communication for transmission to a user equipment (UE) that is in connected mode with both a first transmission and reception point (TRP) and a second TRP. For instance, the network may encode a message having a CSI-ReportConfig for transmission to a UE.

The CSI-RS reporting configuration may include a plurality of CSI-RS resource sets. For instance, the CSI-RS reporting configuration may comprise the first option of the CSI-ReportConfig 202 with a single CMR set 206 or the second option of the CSI-ReportConfig 204 with second CMR set 210 CSI-RS as discussed with reference to FIG. 2.

In some embodiments, the CSI reporting configurations may comprise a single CMR set with a first subset within the single CMR set comprising a first group of CSI-resources associated with a first TRP, and a second subset within the single CMR set comprising a second group of CSI-RS resources associated with a second TRP. In some embodiments, the method 300 may further comprise encoding a bitmap that indicates which resources of the single CMR set correspond to the first TRP, and which resources of the single CMR set correspond to the second TRP. In some embodiments, the method 300 may further comprise encoding an integer with a value of N1, wherein the integer indicates that a first N1 number of resources of the single CMR set correspond to the first TRP and the remaining resources of the single CMR set correspond to the second TRP. In some embodiments, the CSI reporting configuration may comprise a first CMR set and a second CMR set. The first CMR set may comprise the first group of CSI-resources associated with the first TRP, and the second CMR set comprises the second group of CSI-resources associated with the second TRP.

In some embodiments, the method may further comprise configuring pairs of CMR resources from the first group of CMR resources and the second group of CMR resources. For instance, when a network configures N number of CMR resources for UE to measure for group based reporting, the network can further configure M number of pairs of the CMR resources. This may cause the UE to only measure the network configured pair of CMR resources for group based reporting. Group based reporting may reduce energy consumption and overhead associated with the measurement reporting process.

The method 300 further comprises decoding 304 a CSI measurement communication received from the UE. The CSI measurement communication being based on the CSI-RS reporting configuration communication. The decoding 304 process may be based on differential coding as discussed with relation to FIG. 4. The method 300 further comprises scheduling 306 one or more downlink data transmissions based on the CSI measurement communication.

Figure 4:
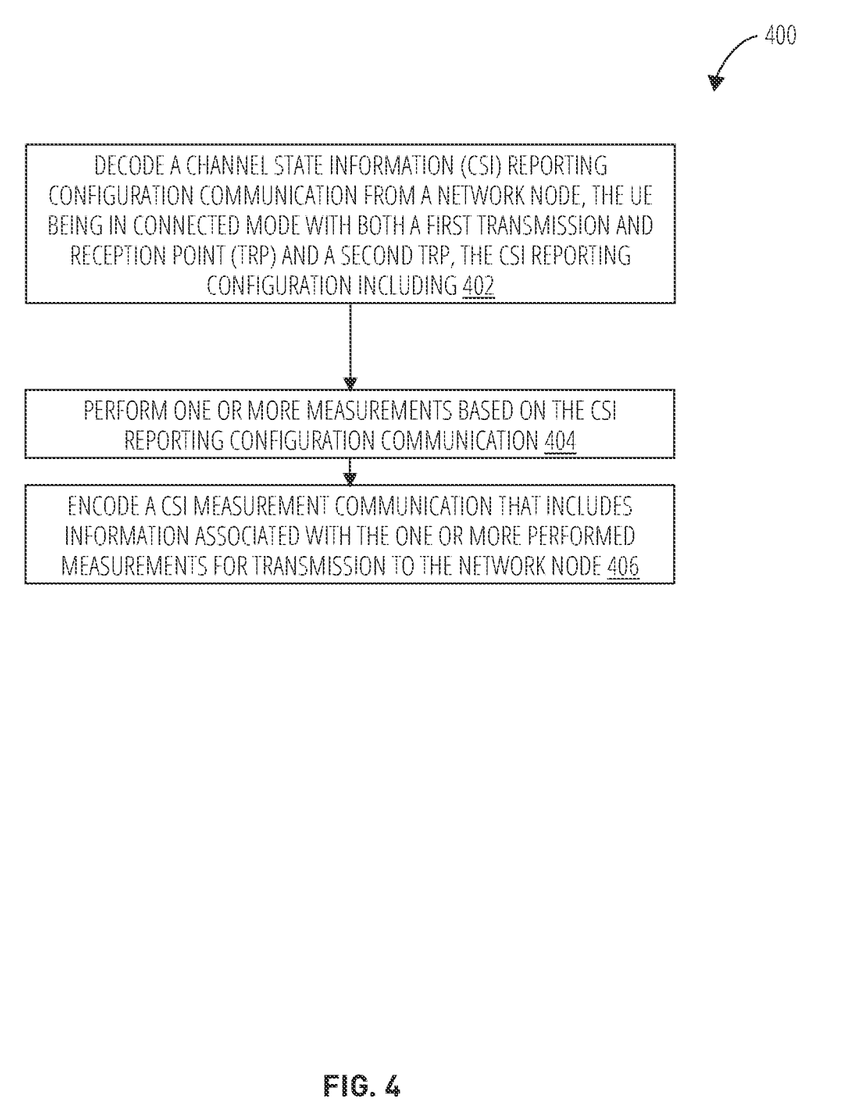
FIG. 4 illustrates a flow chart of a method for a UE to perform beam measurement reporting for multi-TRP operation in accordance with one embodiment.

FIG. 4 illustrates a flow chart of a method 400 for a UE to perform beam measurement reporting for multi-TRP operation. The method 400 may include decoding 402 a channel state information (CSI) reporting configuration communication from a network node. For instance, the UE may decode a message having a CSI-ReportConfig.

The CSI-RS reporting configuration may include a plurality of CSI-RS resource sets. For instance, the CSI-RS reporting configuration may comprise the first option of the CSI-ReportConfig 202 with a single CMR set 206 or the second option of the CSI-ReportConfig 204 with second CMR set 210 CSI-RS as discussed with reference to FIG. 2. In some embodiments, the CSI reporting configurations may comprise a single CMR set with a first subset within the single CMR set comprising a first group of CSI-resources associated with a first TRP, and a second subset within the single CMR set comprising a second group of CSI-RS resources associated with a second TRP. In some embodiments, the method 300 may further comprise encoding a bitmap that indicates which resources of the single CMR set correspond to the first TRP, and which resources of the single CMR set correspond to the second TRP. In some embodiments, the method 300 may further comprise encoding an integer with a value of N1, wherein the integer indicates that a first N1 number of resources of the single CMR set correspond to the first TRP and the remaining resources of the single CMR set correspond to the second TRP. In some embodiments, the CSI reporting configuration may comprise a first CMR set and a second CMR set. The first CMR set may comprise the first group of CSI-resources associated with the first TRP, and the second CMR set comprises the second group of CSI-resources associated with the second TRP.

The method 400 may also include performing 404 one or more measurements based on the CSI reporting configuration communication. The network may configure pairs of CMR resources from the two TRPs. In some embodiments, the UE only measures the NW configured pair of CMR resources for group based reporting The method 400 may further include encoding 406 a CSI measurement communication that includes information associated with the one or more performed measurements for transmission to the network node. For example, the UE may send a CSI-RS resource indicator (CRI). In some embodiments, the bitwidth of the CRI (CSI-RS resource indicator) may depend on a number of configured CMR resources or pairs of CMR resources.

For example, in some embodiment, the network configures N number of CMR resources for UE to measure for group based reporting, and does not configure pairs of the CMR resources. The network may indicate that N1 number of CMR resources belongs to the first TRP and N2 number of CMR resource belongs to the second TRP such that the total number of CMR resources is N=N1+N2. In this embodiment, the UE can freely select one RS from the first N1 CMR resource and another RS from the remaining N2 CMR resource for each pair of resources measured. In these embodiments, the bitwidth for CRI for each pair may be $\lceil \log 2(N1 \times N2) \rceil$.

In some embodiments the network may configure M number of pairs of the CMR resources. The UE may only measure the network configured pair of CMR resources for group based reporting. Therefore, the bitwidth for CRI for each pair may be $\lceil \log 2(M) \rceil$ when the network configures M number of pairs of CMR resources.

For group based signal-to-noise and interference ratio/reference signal received power (SINR/RSRP) reporting, for each pair of beams, the following are some reporting options the UE may use to encode the group based reporting. In a first option, the UE does not use differential encoding. In this first option, each RSRP/SINR may be reported independently in each pair. In a second option, the UE may use differential coding to reduce reporting overhead. In some embodiments, the anchor reference signal, the one used as reference for compute the differential, can be reported. For example, the UE may select a reference signal as an anchor reference signal that causes the differential value is always positive or zero. In some embodiments, the anchor reference signal may be always fixed. For example, the first reference signal reported may be anchor reference signal. This may result in the differential value that can be negative, positive or zero.

For group based SINR reporting, for each pair of beams, UE can report one for both of the following hypothesis. A first hypothesis may be that when computing SINR for one beam in the pair, the UE does not consider the other beam in the pair as interference. A second hypothesis may be that when computing SINR for one beam in the pair, UE considers the other beam in the pair as interference.

Figure 5:
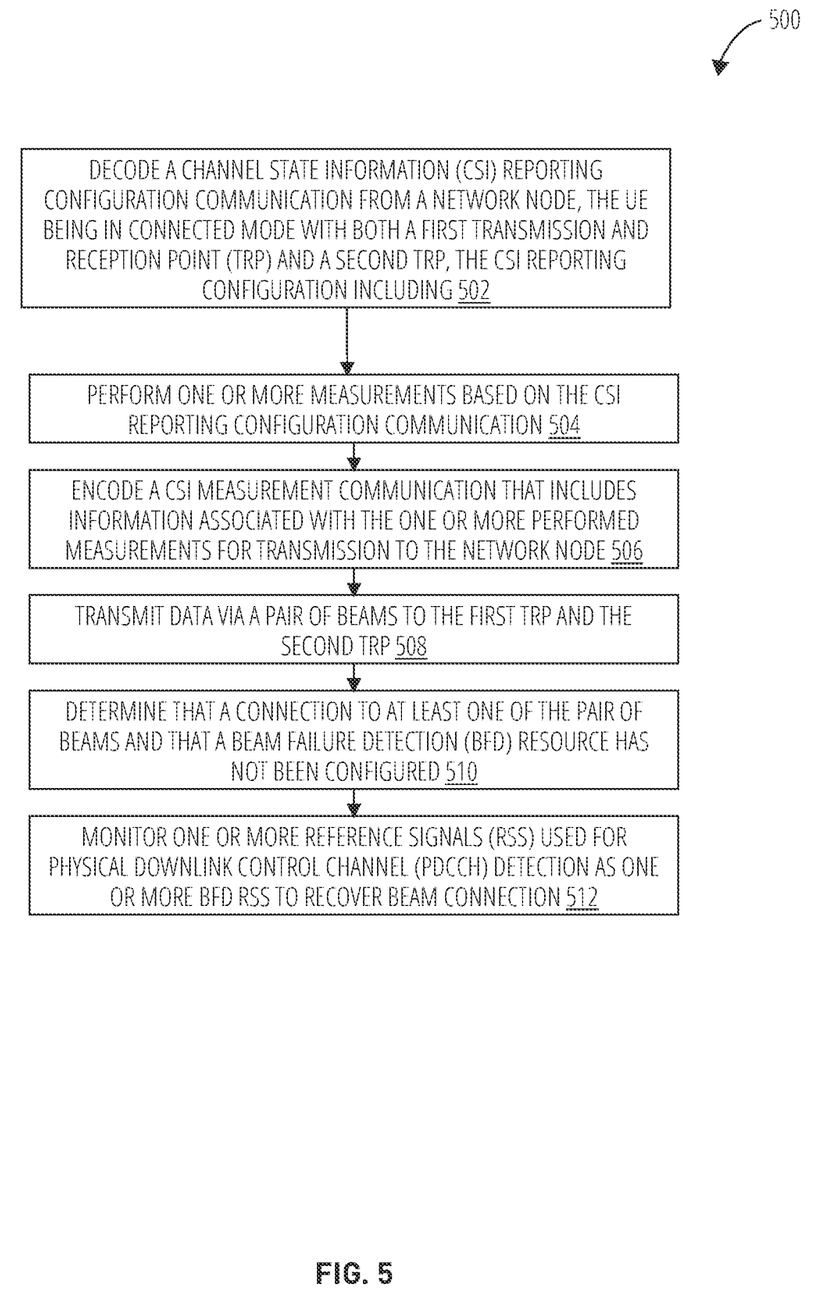
FIG. 5 illustrates a flow chart of a method for a UE for Multi-TRP beam failure recovery in accordance with one embodiment.

FIG. 5 illustrates a flow chart of a method 500 for a UE for Multi-TRP beam failure recovery. Multi-TRP beam failure may occur when one or both of the connections to the two TRPs fail. The UE may decode 502 a channel state information (CSI) reporting configuration communication from a network node, perform 504 one or more measurements based on the CSI reporting configuration communication, and encode 506 a CSI measurement communication that includes information associated with the one or more performed measurements for transmission to the network node as discussed with reference to FIG. 4. Based on the measurements, a connection between the UE and the multiple TRPs may be established. The UE may receive 508 data via a pair of beams from the first TRP and the second TRP.

For UE to monitor the connections to the TRPs and to determine 510 whether a connection to at least one of the pair of beams has failed and that a beam failure detection (BFD) resource has not been configured, the UE may monitor 512 one or more reference signals (RSs) used for Physical Downlink Control Channel (PDCCH) detection as one or more BFD RSs for beam failure.

For example, for a multi-DCI multi-TRP connection when each CORESET is configured implicitly or explicitly with CORESETPoolIndex. and each CORESET is configured with one TCI State the following may be used by the UE for beam failure recovery. When BFD resource, i.e., RadioLinkMonitoringRS, is not explicitly configured, the UE may monitor the RS used for PDCCH detection. The RS used for CORESET configured with CORESETPoolIndex=0 may be associated with the first TRP. Further, the RS used for CORESET configured with CORESETPoolIndex=1 may be associated with the second TRP.

For multi-DCI multi-TRP connection when each CORESET is configured with one TCI State or two TCI States the following may be used by the UE for beam failure recovery. When BFD resource, i.e., RadioLinkMonitoringRS, is not explicitly configured the UE may monitor RS used for PDCCH detection. In situations when a CORESET is configured with two TCI States, the first RS configured may be associated with the first TRP and the second RS configured may be associated with the second TRP. In situations when a CORESET is configured with one TCI State, the RS may be either fixed to the first TRP, or network may configure which TRP the CORESET is associated with.

In some embodiments, the UE may drop one or more RSs when the total number of BFD RS exceeds UE capability. For multi-TRP connection, when BFD resource. i.e., RadioLinkMonitoringRS, is not explicitly configured and UE may monitor the RS used for PDCCH detection as discussed above. However, there may be several RSs to monitor. If the total number of BFD RS exceeds UE capability, the UE may perform BFD RS dropping. There may be several options for the UE to perform BFD RS dropping. A first option may be that dropping is up to UE implementation.

A second option may be that a dropping rule is specified. In some embodiments, the dropping rule may be different depending on whether the BFD RSs are associated with a particular TRP or different TRPs. In embodiments where the BFD RS is associated with a particular TRP the BFD RS may be first ranked in the increasing order of the search space monitoring periodicity (i.e., shorter periodicity has higher priority). If more than one CORESETs are associated with search space of the same monitoring periodicity, the BFD RS may then be ranked in the decreasing order of CORESET index (i.e., larger CORESET index has lower priority).

For BFD RS associated with different TRPs, in some embodiments, the total amount of maximum number of BFD RS across two TRPs may be determined. In some embodiments, there may be no relative priority between the first and the second TRP. In some embodiments the first TRP may have higher priority compared to the second TRP. Thus, the CORESETs associated with the first TRP may be monitored while the CORESETs associated with the second TRP may be only monitored when there is unused bandwidth.

In some embodiments, there may be a fixed amount of maximum number of BFD RS for each TRP. The dropping rule may be carried out independently for each TRP. For example, the BFD RSs may be ranked separately for each TRP and then the lowest ranked BFD RS for each TRP may be dropped. In some embodiments, an unused RS from one TRP might be used for the other TRP.

FIG. 6 illustrates an example architecture of a wireless communication system 600, according to embodiments disclosed herein. The following description is provided for an example wireless communication system 600 that operates in conjunction with the LTE system standards and/or 5G or NR system standards as provided by 3GPP technical specifications.

As shown by FIG. 6, the wireless communication system 600 includes UE 602 and UE 604 (although any number of UEs may be used). In this example, the UE 602 and the UE 604 are illustrated as smartphones (e.g., handheld touchscreen mobile computing devices connectable to one or more cellular networks), but may also comprise any mobile or non-mobile computing device configured for wireless communication.

The UE 602 and UE 604 may be configured to communicatively couple with a RAN 606. In embodiments, the RAN 606 may be NG-RAN, E-UTRAN, etc. The UE 602 and UE 604 utilize connections (or channels) (shown as connection 608 and connection 610, respectively) with the RAN 606, each of which comprises a physical communications interface. The RAN 606 can include one or more base stations, such as base station 612 and base station 614, that enable the connection 608 and connection 610.

In this example, the connection 608 and connection 610 are air interfaces to enable such communicative coupling, and may be consistent with RAT(s) used by the RAN 606, such as, for example, an LTE and/or NR.

In some embodiments, the UE 602 and UE 604 may also directly exchange communication data via a sidelink interface 616. The UE 604 is shown to be configured to access an access point (shown as AP 618) via connection 620. By way of example, the connection 620 can comprise a local wireless connection, such as a connection consistent with any IEEE 802.11 protocol, wherein the AP 618 may comprise a Wi-Fi® router. In this example, the AP 618 may be connected to another network (for example, the Internet) without going through a CN 624.

In embodiments, the UE 602 and UE 604 can be configured to communicate using orthogonal frequency division multiplexing (OFDM) communication signals with each other or with the base station 612 and/or the base station 614 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 612 or base station 614 may be implemented as one or more software entities running on server computers as part of a virtual network. In addition, or in other embodiments, the base station 612 or base station 614 may be configured to communicate with one another via interface 622. In embodiments where the wireless communication system 600 is an LTE system (e.g., when the CN 624 is an EPC), the interface 622 may be an X2 interface. The X2 interface may be defined between two or more base stations (e.g., two or more eNBs and the like) that connect to an EPC, and/or between two eNBs connecting to the EPC. In embodiments where the wireless communication system 600 is an NR system (e.g., when CN 624 is a 5GC), the interface 622 may be an Xn interface. The Xn interface is defined between two or more base stations (e.g., two or more gNBs and the like) that connect to 5GC, between a base station 612 (e.g., a gNB) connecting to 5GC and an eNB, and/or between two eNBs connecting to 5GC (e.g., CN 624).

The RAN 606 is shown to be communicatively coupled to the CN 624. The CN 624 may comprise one or more network elements 626, which are configured to offer various data and telecommunications services to customers/subscribers (e.g., users of UE 602 and UE 604) who are connected to the CN 624 via the RAN 606. The components of the CN 624 may be implemented in one physical device or separate physical devices including components to read and execute instructions from a machine-readable or computer-readable medium (e.g., a non-transitory machine-readable storage medium).

In embodiments, the CN 624 may be an EPC, and the RAN 606 may be connected with the CN 624 via an S1 interface 628. In embodiments, the S1 interface 628 may be split into two parts, an S1 user plane (S1-U) interface, which carries traffic data between the base station 612 or base station 614 and a serving gateway (S-GW), and the S1-MME interface, which is a signaling interface between the base station 612 or base station 614 and mobility management entities (MMEs).

In embodiments, the CN 624 may be a 5GC, and the RAN 606 may be connected with the CN 624 via an NG interface 628. In embodiments, the NG interface 628 may be split into two parts, an NG user plane (NG-U) interface, which carries traffic data between the base station 612 or base station 614 and a user plane function (UPF), and the S1 control plane (NG-C) interface, which is a signaling interface between the base station 612 or base station 614 and access and mobility management functions (AMFs).

Generally, an application server 630 may be an element offering applications that use internet protocol (IP) bearer resources with the CN 624 (e.g., packet switched data services). The application server 630 can also be configured to support one or more communication services (e.g., VoIP sessions, group communication sessions, etc.) for the UE 602 and UE 604 via the CN 624. The application server 630 may communicate with the CN 624 through an IP communications interface 632.

FIG. 7 illustrates a system 700 for performing signaling 734 between a wireless device 702 and a network device 718, according to embodiments disclosed herein. The system 700 may be a portion of a wireless communications system as herein described. The wireless device 702 may be, for example, a UE of a wireless communication system. The network device 718 may be, for example, a base station (e.g., an eNB or a gNB) of a wireless communication system.

The wireless device 702 may include one or more processor(s) 704. The processor(s) 704 may execute instructions such that various operations of the wireless device 702 are performed, as described herein. The processor(s) 704 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 702 may include a memory 706. The memory 706 may be a non-transitory computer-readable storage medium that stores instructions 708 (which may include, for example, the instructions being executed by the processor(s) 704). The instructions 708 may also be referred to as program code or a computer program. The memory 706 may also store data used by, and results computed by, the processor(s) 704.

The wireless device 702 may include one or more transceiver(s) 710 that may include radio frequency (RF) transmitter and/or receiver circuitry that use the antenna(s) 712 of the wireless device 702 to facilitate signaling (e.g., the signaling 734) to and/or from the wireless device 702 with other devices (e.g., the network device 718) according to corresponding RATs.

The wireless device 702 may include one or more antenna(s) 712 (e.g., one, two, four, or more). For embodiments with multiple antenna(s) 712, the wireless device 702 may leverage the spatial diversity of such multiple antenna(s) 712 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 702 may be accomplished according to precoding (or digital beamforming) that is applied at the wireless device 702 that multiplexes the data streams across the antenna(s) 712 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 702 may implement analog beamforming techniques, whereby phases of the signals sent by the antenna(s) 712 are relatively adjusted such that the (joint) transmission of the antenna(s) 712 can be directed (this is sometimes referred to as beam steering).

The wireless device 702 may include one or more interface(s) 714. The interface(s) 714 may be used to provide input to or output from the wireless device 702. For example, a wireless device 702 that is a UE may include interface(s) 714 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 710/antenna(s) 712 already described) that allow for communication between the UE and other devices and may operate according to known protocols (e.g., Wi-Fi®, Bluetooth®, and the like).

The wireless device 702 may include a multi-TRP module 716. The multi-TRP module 716 may be implemented via hardware, software, or combinations thereof. For example, the multi-TRP module 716 may be implemented as a processor, circuit, and/or instructions 708 stored in the memory 706 and executed by the processor(s) 704. In some examples, the multi-TRP module 716 may be integrated within the processor(s) 704 and/or the transceiver(s) 710. For example, the multi-TRP module 716 may be implemented by a combination of software components (e.g., executed by a DSP or a general processor) and hardware components (e.g., logic gates and circuitry) within the processor(s) 704 or the transceiver(s) 710.

The multi-TRP module 716 may be used for various aspects of the present disclosure, for example, aspects of FIGS. 1, 2, 4, and 5. The multi-TRP module 716 is configured to perform beam measurements according to the network communication and perform beam failure recovery.

The network device 718 may include one or more processor(s) 720. The processor(s) 720 may execute instructions such that various operations of the network device 718 are performed, as described herein. The processor(s) 704 may include one or more baseband processors implemented using, for example, a CPU, a DSP, an ASIC, a controller, an FPGA device, another hardware device, a firmware device, or any combination thereof configured to perform the operations described herein.

The network device 718 may include a memory 722. The memory 722 may be a non-transitory computer-readable storage medium that stores instructions 724 (which may include, for example, the instructions being executed by the processor(s) 720). The instructions 724 may also be referred to as program code or a computer program. The memory 722 may also store data used by, and results computed by, the processor(s) 720.

The network device 718 may include one or more transceiver(s) 726 that may include RF transmitter and/or receiver circuitry that use the antenna(s) 728 of the network device 718 to facilitate signaling (e.g., the signaling 734) to and/or from the network device 718 with other devices (e.g., the wireless device 702) according to corresponding RATs.

The network device 718 may include one or more antenna(s) 728 (e.g., one, two, four, or more). In embodiments having multiple antenna(s) 728, the network device 718 may perform MIMO, digital beamforming, analog beamforming, beam steering, etc., as has been described.

The network device 718 may include one or more interface(s) 730. The interface(s) 730 may be used to provide input to or output from the network device 718. For example, a network device 718 that is a base station may include interface(s) 730 made up of transmitters, receivers, and other circuitry (e.g., other than the transceiver(s) 726/antenna(s) 728 already described) that enables the base station to communicate with other equipment in a core network, and/or that enables the base station to communicate with external networks, computers, databases, and the like for purposes of operations, administration, and maintenance of the base station or other equipment operably connected thereto.

The network device 718 may include a multi-TRP configuration module 732. The multi-TRP configuration module 732 may be implemented via hardware, software, or combinations thereof. For example, the multi-TRP configuration module 732 may be implemented as a processor, circuit, and/or instructions 724 stored in the memory 722 and executed by the processor(s) 720. In some examples, the multi-TRP configuration module 732 may be integrated within the processor(s) 720 and/or the transceiver(s) 726. For example, the multi-TRP configuration module 732 may be implemented by a combination of software components (e.g., executed by a DSP or a general processor) and hardware components (e.g., logic gates and circuitry) within the processor(s) 720 or the transceiver(s) 726.

The multi-TRP configuration module 732 may be used for various aspects of the present disclosure, for example, aspects of FIGS. 1-3. The multi-TRP configuration module 732 is configured to generate a CSI reporting configuration communication.

Embodiments contemplated herein include an apparatus comprising means to perform one or more elements of the method 400 and method 500. This apparatus may be, for example, an apparatus of a UE (such as a wireless device 702 that is a UE, as described herein).

Embodiments contemplated herein include one or more non-transitory computer-readable media comprising instructions to cause an electronic device, upon execution of the instructions by one or more processors of the electronic device, to perform one or more elements of the method 400 and method 500. This non-transitory computer-readable media may be, for example, a memory of a UE (such as a memory 706 of a wireless device 702 that is a UE, as described herein).

Embodiments contemplated herein include an apparatus comprising logic, modules, or circuitry to perform one or more elements of the method 400 and method 500. This apparatus may be, for example, an apparatus of a UE (such as a wireless device 702 that is a UE, as described herein).

Embodiments contemplated herein include an apparatus comprising: one or more processors and one or more computer-readable media comprising instructions that, when executed by the one or more processors, cause the one or more processors to perform one or more elements of the method 400 and method 500. This apparatus may be, for example, an apparatus of a UE (such as a wireless device 702 that is a UE, as described herein).

Embodiments contemplated herein include a signal as described in or related to one or more elements of the method 400 and method 500.

Embodiments contemplated herein include a computer program or computer program product comprising instructions, wherein execution of the program by a processor is to cause the processor to carry out one or more elements of the method 400 and method 500. The processor may be a processor of a UE (such as a processor(s) 704 of a wireless device 702 that is a UE, as described herein). These instructions may be, for example, located in the processor and/or on a memory of the UE (such as a memory 706 of a wireless device 702 that is a UE, as described herein).

Embodiments contemplated herein include an apparatus comprising means to perform one or more elements of the method 300. This apparatus may be, for example, an apparatus of a base station (such as a network device 718 that is a base station, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a base station (such as a memory 722 of a network device 718 that is a base station, as described herein).

Embodiments contemplated herein include an apparatus comprising logic, modules, or circuitry to perform one or more elements of the method 300. This apparatus may be, for example, an apparatus of a base station (such as a network device 718 that is a base station, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a base station (such as a network device 718 that is a base station, as described herein).

Embodiments contemplated herein include a signal as described in or related to one or more elements of the method 300.

Embodiments contemplated herein include a computer program or computer program product comprising instructions, wherein execution of the program by a processing element is to cause the processing element to carry out one or more elements of the method 300. The processor may be a processor of a base station (such as a processor(s) 720 of a network device 718 that is a base station, as described herein). These instructions may be, for example, located in the processor and/or on a memory of the UE (such as a memory 722 of a network device 718 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a network node, comprising:
encoding a channel state information (CSI) reporting configuration communication for transmission to a user equipment (UE) that is in connected mode with both a first transmission and reception point (TRP) and a second TRP, the CSI reporting configuration communication including:
a first group of Channel Measurement Resource (CMR) resources for the first TRP; and
a second group of CMR resources for the second TRP, wherein the CSI reporting configuration communication comprises a single CMR set, and wherein the first group of CMR resources is a first subset within the single CMR set, and the second group of CMR resources is a second subset within the single CMR set;
decoding a CSI measurement communication received from the UE, the CSI measurement communication being based on the CSI reporting configuration communication, wherein the CSI measurement communication comprises a CSI-RS resource indicator (CRI), wherein
when the network node does not configure pairs of CMR resources, a bitwidth for the CRI for each pair of the pairs of CMR resources is $\lceil \log 2\ (N1 \times N2) \rceil$, where N1 is a number of resources in the first group of CMR resources and N2 is a number of resources in the second group of CMR resources, and
when the network node does configure the pairs of CMR resources, the bitwidth for the CRI for each pair is $\lceil \log 2\ (M) \rceil$, where M is a number of the pairs of CMR resources configured by the network node, wherein N1, N2, and M are positive integers; and
based on the CSI measurement communication, scheduling one or more downlink data transmissions.

2. The method of claim 1, further comprising encoding a bitmap that indicates which resources of the single CMR set correspond to the first TRP, and which resources of the single CMR set correspond to the second TRP.

3. The method of claim 1, further comprising encoding an integer with a value of N1, wherein the integer indicates that a first N1 resources of the single CMR set correspond to the first TRP and remaining resources of the single CMR set correspond to the second TRP.

4. The method of claim 1 wherein the CSI reporting configurations further comprises a first CMR set and a second CMR set, wherein the first CMR set comprises the first group of CMR resources, and the second CMR set comprises the second group of CMR resources.

5. The method of claim 1, further comprising configuring pairs of CMR resources from the first group of CMR resources and the second group of CMR resources.

6. A method for a user equipment (UE), comprising:
decoding a channel state information (CSI) reporting configuration communication from a network node, the UE being in connected mode with both a first transmission and reception point (TRP) and a second TRP, the CSI reporting configuration communication including:
a first group of Channel Measurement Resource (CMR) resources for the first TRP; and
a second group of CMR resources for the second TRP;
performing one or more measurements based on the CSI reporting configuration communication; and
encoding a CSI measurement communication that includes information associated with the one or more performed measurements for transmission to the network node, wherein the CSI measurement communication comprises a CSI-Reference signal (RS) resource indicator (CRI), wherein
when the network node does not configure pairs of CMR resources, a bitwidth for the CRI for each pair of the pairs of CMR resources is $\lceil \log 2\ (N1 \times N2) \rceil$, where N1 is a number of resources in the first group of CMR resources and N2 is a number of resources in the second group of CMR resources, and
when the network node does configure the pairs of CMR resources, the bitwidth for the CRI for each pair is $\lceil \log 2\ (M) \rceil$, where M is a number of the pairs of CMR resources configured by the network node, wherein N1, N2, and M are positive integers.

7. The method of claim 6, wherein the CSI reporting configuration indicates pairs of resources between the first group of CMR resources and the second group of CMR resources, wherein the one or more measurements correspond to the pairs of resources.

8. The method of claim 6, wherein the CSI measurement communication comprises a group based signal-to-noise and interference ratio/reference signal received power (SINR/RSRP) report, the group based SINR/RSRP report including measurements for each pair of beams, wherein each RSRP/SINR measurement is reported independently in each pair of beams.

9. The method of claim 6, wherein the CSI measurement communication comprises a group based signal-to-noise and interference ratio/reference signal received power (SINR/RSRP) report, wherein differential encoding is used for the group based SINR/RSRP report, wherein the method further comprises selecting and reporting an anchor reference signal (RS) that causes differential values to be positive or zero.

10. The method of claim 6, wherein the CSI measurement communication comprises a group based signal-to-noise and interference ratio/reference signal received power (SINR/RSRP) report, wherein differential encoding is used for the group based SINR/RSRP report, wherein an anchor RS is fixed.

11. The method of claim 6, wherein for group based signal-to-noise and interference ratio (SINR) reporting, for each pair of beams, the CSI measurement communication includes one or both of the following:
a first computed SINR for one beam in a pair that does not consider a second beam in the pair as interference, and
a second computed SINR for the one beam in the pair that considers the second beam in the pair as the interference.

12. A method for a user equipment (UE), comprising:
decoding a channel state information (CSI) reporting configuration communication from a network node, the UE being in connected mode with both a first transmission and reception point (TRP) and a second TRP, the CSI reporting configuration communication including:
a first group of Channel Measurement Resource (CMR) resources for the first TRP; and
a second group of CMR resources for the second TRP;
performing one or more measurements based on the CSI reporting configuration communication;
encoding a CSI measurement communication that includes information associated with the one or more performed measurements for transmission to the network node, wherein the CSI measurement communication comprises a CSI-Reference signal (RS) resource indicator (CRI), wherein the CSI measurement communication comprises a CSI-RS resource indicator (CRI), wherein
when the network node does not configure pairs of CMR resources, a bitwidth for the CRI for each pair of the pairs of CMR resources is ⌈log 2 (N1×N2)⌉, where N1 is a number of resources in the first group of CMR resources and N2 is a number of resources in the second group of CMR resources, and
when the network node does configure the pairs of CMR resources, the bitwidth for the CRI for each pair is ⌈log 2 (M)⌉, where M is a number of the pairs of CMR resources configured by the network node, wherein N1, N2, and M are positive integers;
receiving data via a pair of beams from the first TRP and the second TRP;
determining whether a connection to at least one of the pair of beams has failed, when a beam failure detection (BFD) resource has not been configured; and
monitoring one or more reference signals (RSs) used for Physical Downlink Control Channel (PDCCH) detection as one or more BFD RSs for beam failure monitoring.

13. The method of claim 12, wherein an RS used for control resource sets (CORESETs) configured with CORESETPoolIndex=0 is associated with the first TRP, and wherein an RS used for CORESET configured with CORESETPoolIndex=1 is associated with the second TRP.

14. The method of claim 12, wherein when a CORESET is configured with two transmission configuration indication (TCI) States:
a first RS configured is associated with the first TRP, and
a second RS configured is associated with the second TRP; and
wherein when the CORESET is configured with one TCI State, the CORESET is fixed to the first TRP or the network node configures which TRP the CORESET is associated with.

15. The method of claim 12, further comprising dropping one or more BFD RSs based on a UE implementation in response to monitoring multiple RSs and a total number of the RSs exceeding UE capability.

16. The method of claim 12, further comprising:
ranking the one or more BFD RSs based on search space monitoring periodicity, where a first BFD RS associated with a CORESET with a shorter periodicity has higher priority than a second BFD RS associated with a CORESET with a longer periodicity, wherein
in response to more than one CORESETs being associated with search spaces of a same monitoring periodicity, the BFD RSs are then ranked in decreasing order of CORESET index where a larger CORESET index has lower priority than a smaller CORESET index; and
dropping one or more beam failure detection reference signal (BFD RS) based on the ranking in response to a total number of the BFD RS exceeding UE capability.

17. The method of claim 16, wherein to rank BFD RSs associated with different TRPs, the first TRP has higher priority compared to the second TRP.

18. The method of claim 16, wherein for BFD RSs associated with different TRPs, dropping is performed independently for each TRP.

* * * * *